United States Patent
Eisenberg et al.

[15] 3,694,558
[45] Sept. 26, 1972

[54] NAVIGATION LIGHT SIMULATOR

[72] Inventors: Robert M. Eisenberg, Derwood; George R. Quick, Silver Spring, both of Md.

[73] Assignee: The Singer Company, New York, N.Y.

[22] Filed: April 14, 1971

[21] Appl. No.: 133,890

[52] U.S. Cl. ............... 35/10.2, 35/12 N, 235/184, 350/6, 350/285
[51] Int. Cl. .......................................... G09b 9/06
[58] Field of Search......35/10.2, 12 N; 350/6, 7, 285; 235/184

[56] References Cited

UNITED STATES PATENTS 2,581,358  1/1952  Busignies et al. ........... 35/10.2
2,714,199  7/1955  Adams et al. ............... 35/10.2

FOREIGN PATENTS OR APPLICATIONS 1,903,369  8/1969  Germany .................... 35/10.2
1,200,442  7/1970  Great Britain ............... 35/10.2
704,453    2/1954  Great Britain ............... 35/10.2
143,666    1961    U.S.S.R. .................... 35/12 N

OTHER PUBLICATIONS

IBM Tech. Disclosure: Betts: Light Spot Positioner Vol. 8, No. 2 July 1965. p. 286–287

Primary Examiner—Felix D. Gruber
Attorney—Francis L. Masselle, William Grobman and Charles S. McGuire

[57] ABSTRACT

A navigation light simulator, for use in a ship's bridge simulator, in which a spot is scanned across the screen and the light selectively directed to observers on the bridge along lines of sight to the simulated lights is shown. In one embodiment a plurality of shutters placed between the screen and the observers are used to expose the spot when along the proper lines, and in a second embodiment the screen comprises a plurality of rotatable mirrors to direct the spot along the proper lines of sight as the spot scans.

6 Claims, 7 Drawing Figures

NAVIGATION LIGHT SIMULATOR

This invention relates to visual display systems in general and more particularly to a display system useful in shipboard navigation training.

It is becoming increasingly important to have well trained personnel on the bridges of ships navigating along the coast, on the high seas and the inland waterways. Tanker collisions and groundings are daily causing serious ecological problems resulting from spilled oil. To train seamen on a ship can be expensive since the number of personnel who must be carried on board is increased. Therefore, there is a need for fixed-based ship or bridge simulators capable of conducting portions of the training necessary for training competent seamen.

One of the most important areas of training is that involving recognition of navigation lights used in determining the ships' position. A missed light or mistaken light may result in grounding. The present invention provides a visual system which may be used to accurately simulate such navigation lights for such training.

It is the object of this invention to provide a visual system which will present a series of selected lights imaged at infinity to an observer.

Another object is to provide such a system which will be useful in training seamen in the recognition of navigation lights.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
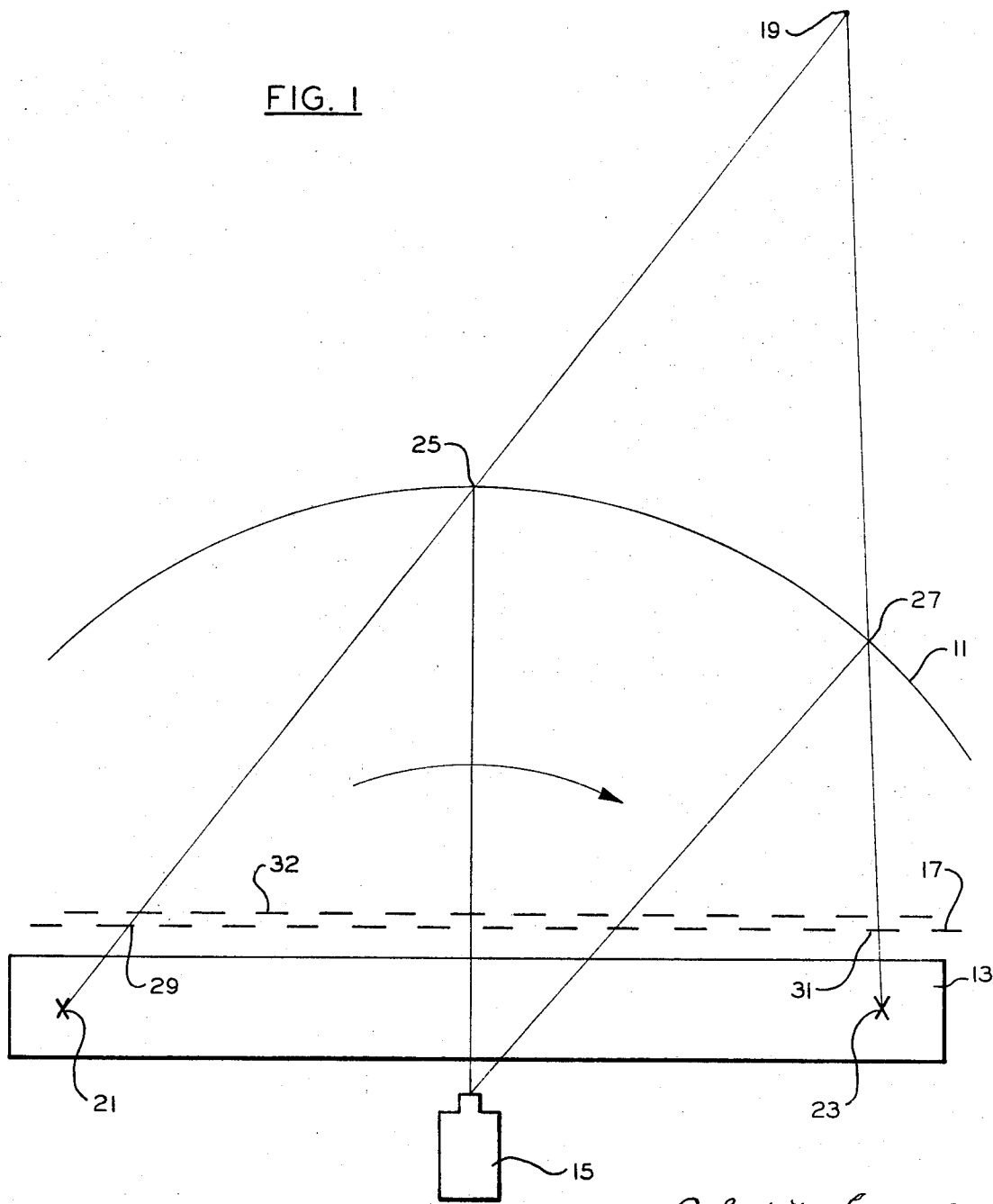
FIG. 1 is a diagrammatic top view of a first embodiment of the invention.

FIG. 1 shows a first embodiment of the invention. A screen 11 is located in front of a simulated ship's bridge 13. A spot projector 15 is located above bridge 13 at the center of curvature of screen 11. Located between bridge 13 and screen 11 is a rippled or focal plane shutter 17. Projector 15 is arranged to periodically scan across screen 11 above shutter 17.

To understand the operation of the invention, assume a navigation light is located at point 19. Point 21 is the location of a first observer on the bridge and point 23 the location of a second observer. Point 25 is the position on screen 11 where the light should appear to have the proper angular position as viewed by the first observer and point 27 the corresponding position for the second observer. To accomplish this apparent positioning the shutters are synchronized with the scan of projector 15. Thus when the spot is at point 25 the shutter in front of the observer at point 21 will open and when the light is at point 27 the shutter in front of the observer at point 23 will open.

That only an observer at point 23 will see the light when the shutter in front of him is opened is clearly shown. The shutter 29 is opened when the spot is at point 25 and the observer at point 21 will see the spot. But the other observer at point 23 across the bridge from him will not see the light since he is not lined up with the open shutter. When the light reaches point 27 where the observer at point 21 should see it shutter 29 will be closed blocking the view of the observer at 23 and shutter 31 will be open allowing the observer at 23 to view it. As long as the scan is at a high rate the light will appear to present at all times in the proper position for each observer due to the response time of the eye.

Figure 2:
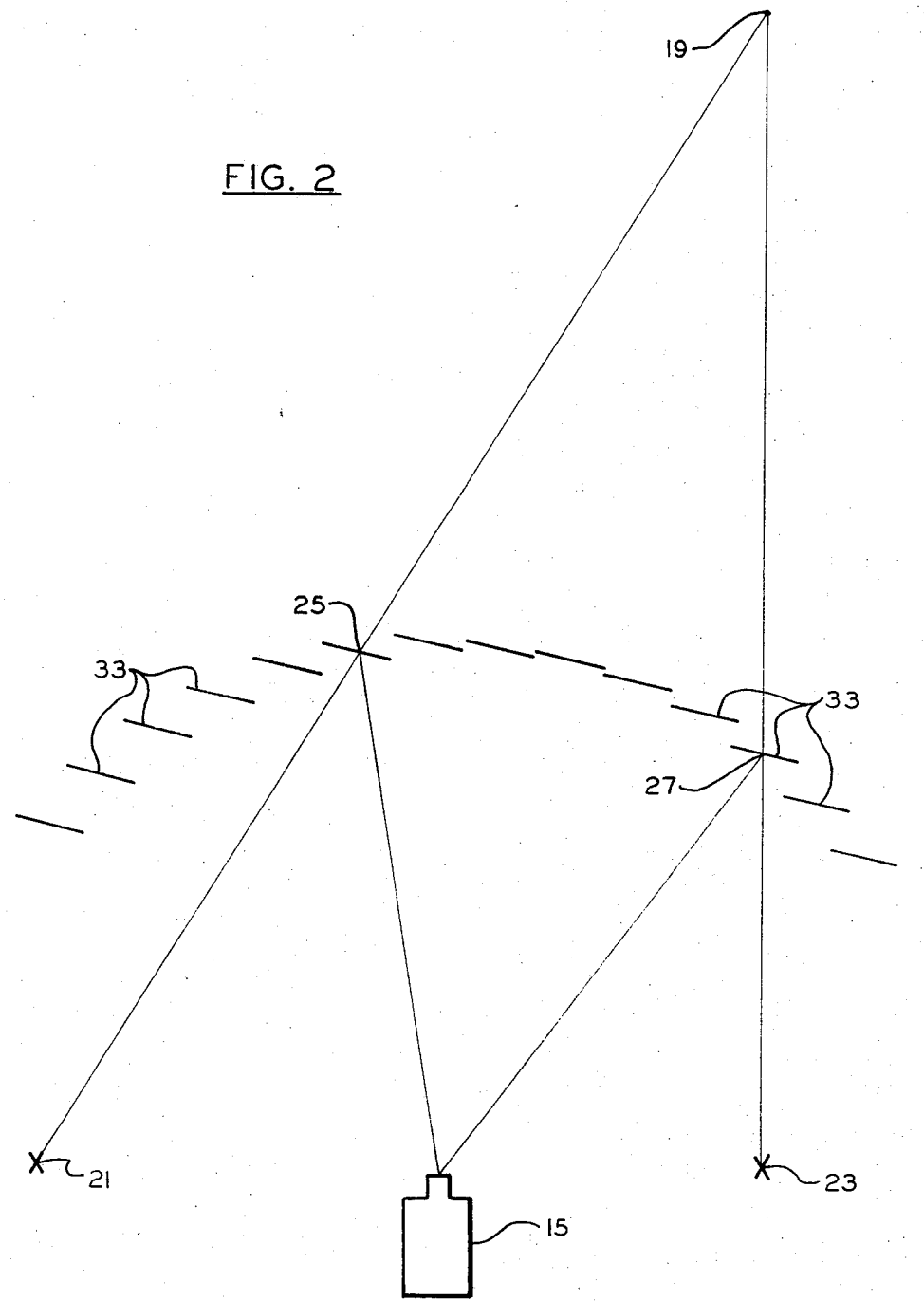
FIG. 2 is a diagrammatic top view of a second embodiment of the invention.

FIG. 2 shows a second embodiment of the system with screen 11 and shutter 17 of the first embodiment replaced by a plurality of mirrors 33. In this embodiment the mirrors are rotated to cause the spot to appear in the proper location.

The light to be simulated is at point 19 and should appear to be at point 25 for an observer at point 21 and at point 27 to an observer at point 23. Individual mirrors are then rotated making use of the optical principle that the angle of incidence equals the angle of reflection to cause the light to be reflected as desired. Because of these same principles the observer at point 21 will not see any light if he looks in the mirror at point 27.

Figure 3:
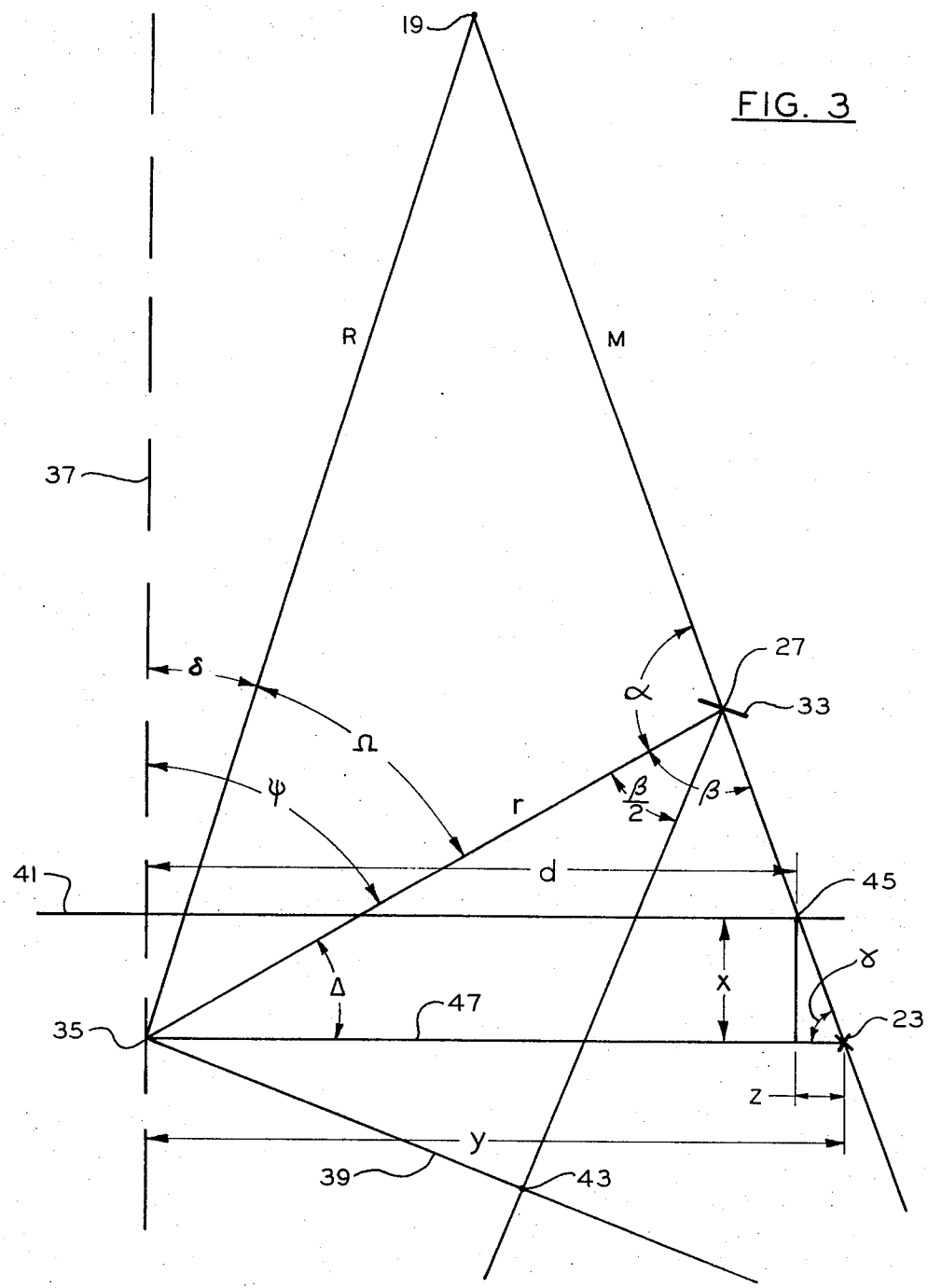
FIG. 3 is a trigonometric diagram showing the angular relationship of the elements of FIGS. 1 and 2.

FIG. 3 is a trigonometric diagram showing how the proper mirror position or open shutter position may be determined. For purposes of analysis, the observer at 23 is assumed to be in line with the projection point 35 (i.e., on a line from point 35 perpendicular to a reference line 37). If this is not the case, adjustments may be made using analysis similar to that which follows.

First the analysis of the embodiment of FIG. 2 will be considered.

The angle $\psi$ between the line from projection point 35 to mirror 33 and reference line 37 is known, as is the bearing angle $\delta$ between the line from light 19 to projector point 35 and reference line 37. From these the angle $\Omega = \psi - \delta$ may be found. Also known is $R$, the distance to the light, and $r$ the radius of the screen or distance to the mirrors. From the law of cosines $M^2 = R^2 + r^2 - 2Rr \cos \Omega$ and from the law of sines $M/\sin \Omega = R/\sin \alpha$ Thus, after $M$ is found using the law of cosines, $\sin \alpha = R \sin \Omega/M$ may be found from the law of sines. Knowing sine $\alpha$, $\alpha$ may then be determined. If a mirror 33 is located at point 27 it must be perpendicular to a line bisecting $\beta$ due to the relationship that the angle of incidence equals the angle of reflection.

It is then possible to determine the angle which mirror 33 makes with a line parallel to reference line 37. Line 39 is parallel to mirror 33 and thus perpendicular at point 43 to the line bisecting $\beta$. Thus, two angles of the triangle 35-27-43 are known and the remaining angle will equal $180 - 90 - \beta/2$ or $90 - \beta/2$. By adding this to $\psi$, the angle the mirror 33 must make with respect to line 37 will be $\psi + 90 - \beta/2$.

If instead the shutter system of FIG. 1 is to be used further analysis along the same lines is required. For the purpose of this analysis assume that mirror 33 is not present and that point 27 is a point on the screen of FIG. 1. Line 41 represents the shutter line. The location of a shutter which must be open is at point 45 a distance $d$ from reference line 37. The angle $\Delta$ at point 35 will equal $90 - \psi$ since line 47 is perpendicular to line 37 as is line 41. The angle $\alpha$ at point 23 will equal $180 - (90 - \psi) - \beta$ or $90 + \psi - \beta$. The distance y from reference line 37 to point 23 is known as is the distance x between the observer line 47 and the shutter line 41. Thus $d = y - z$ and, since $z = x/\tan \gamma$, $d$ will equal $y - x/\tan \gamma$. In this manner the proper shutter location to be opened may be found.

Figure 4:
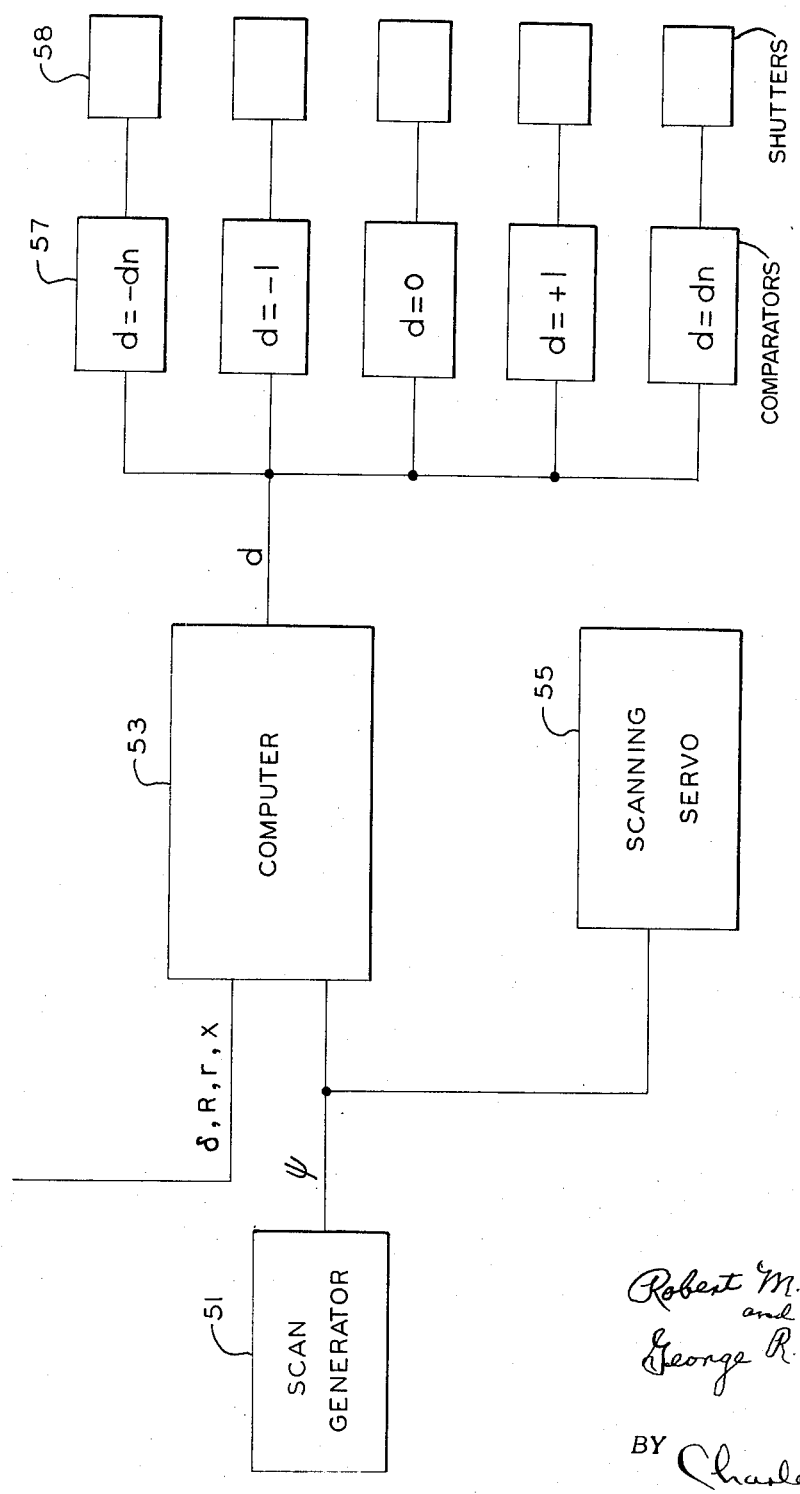
FIG. 4 is a block diagram of a preferred drive system for use in the embodiment of FIG. 1.

FIG. 4 shows a block diagram of a system which may be used to drive the shutters of FIG. 1. A scan generator 51, similar to a TV scan generator, provides a ramp signal which is the analog of the scan angle $\psi$. This analog signal is provided as an input to computer 53 along with the constants $r$ and $x$ and the values $\delta$ and R associated with the light to be displayed. Computer 53 is an analog computer of the type well known in the art which will solve the equations described above to obtain values of $d$ for each point in time.

The output $\psi$ of scan generator 51 is also used to drive position servo 55 which drives the scanning mechanism of projector 15 of FIG. 1; such servo systems and scanning mechanisms are well known in the art. The output d from computer 53 is provided as an input to a series of comparators 57 each of which is associated with a shutter actuating mechanism 58. Comparators 57 are set to provide an output when the d from computer 53 is within a certain tolerance of the distance by which their associated shutter is displaced from the reference. Thus, as $\psi$ causes the spot to sweep across the screen, computer 53 will provide a synchronized d signal which will cause the shutters to open and close in synchronism with movement of the spot.

Figure 5:
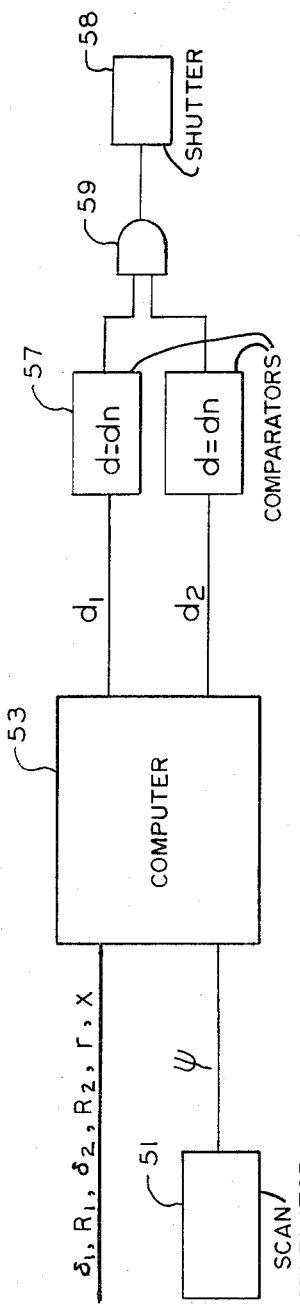
FIG. 5 is a block diagram of a modification to the system of FIG. 4.

FIG. 5 shows the system used if more than one light is to be displayed at a time. Now computer 53 has inputs $\delta_1$ and $R_1$ relating to one light and $\delta_2$ and $R_2$ relating to a second light; and $d$ outputs $d_1$ and $d_2$ result, and for each shutter mechanism 58 two comparators 57 are needed. The outputs of the two comparators are ORed together in OR gate 59 and the output of the gate connected to mechanism 58.

Figure 6:
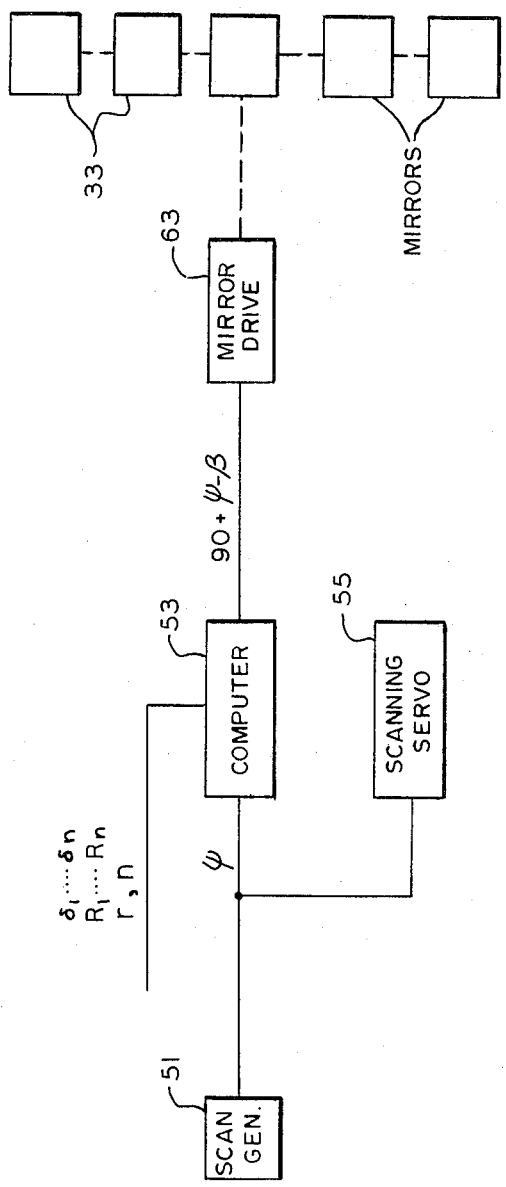
FIG. 6 is a block diagram of a preferred drive system for the embodiment of FIG. 2.

The system used to drive the embodiment of FIG. 2 is shown in FIG. 6. Scan generator 51 again provides $\psi$ to computer 53 and scanning servo 55. Also provided as inputs to computer 53 are the $\delta$ and R of each light, the constants $r$ and $x$, and the number of lights $n$. Computer 53 in this case will compute the angle $90 + \psi - \beta$ using the equations described earlier herein. Since in this case a mirror which can only be in one position at one time, is being driven rather than shutters, of which any number may be open at a given time, a series of scans equal to the number of lights to be displayed is required. That is in a situation where two lights are visible they may appear at the same point on the screen for two observers i.e., since the screen is made up of a plurality of mirrors, if a spot is required to be reflected from the same position to simulate two different lights to two observers, one mirror would be required to be in two positions at the same time.

For example, referring to FIG. 1, if a second light was located along a line from observer 21 passing through point 27, then observer 23 should see a light when the scan is at that spot representing light 19 and observer 21 should also see a light representing the second light. Opening shutter 31 shows observer 23 his light and opening a shutter at 32 would show observer 21 his light. But if the same situation occurred with the mirrors of FIG. 2, the mirror 33 at point 27 would be required to take two positions simultaneously to show light 19 to observer 23 and a second light to observer 21. Thus two separate scans are required, one with the mirror positioned to show observer 23 light 19 and one with the mirror positioned to show observer 21 the second light.

Thus, computer 53 will include indexing means whereby the first scan will be used with $\delta_1$ and $R_1$, the second with $\delta_2$ and $R_2$ and so on until $\delta_n$ and $R_n$ are reached at which time the process will be repeated. The output from computer 53 will drive mirror servo 63 which is mechanically connected to the mirrors all of which are connected together. At any given time only one mirror will be properly positioned. However, that mirror will be the one on which the spot is positioned, thus making the system accurate over the full scan. The scan must be repeated 25 to 30 times per second for each light to avoid flicker. Thus the scan rate must be adjusted based on the maximum number of lights e.g. with three lights, 75 – 90 scans per second would be required.

Since most lights to be observed will be at or near infinity as observed from the bridge, the required mirror movement may be minimized by initializing the mirror positions to form a parobolic Frensel mirror. For a light dead ahead, an observer at any position would see the light properly positioned. As the light moves from dead ahead but remains at infinity the mirrors need only be rotated to form a rotated parobolic mirror.

Figure 7:
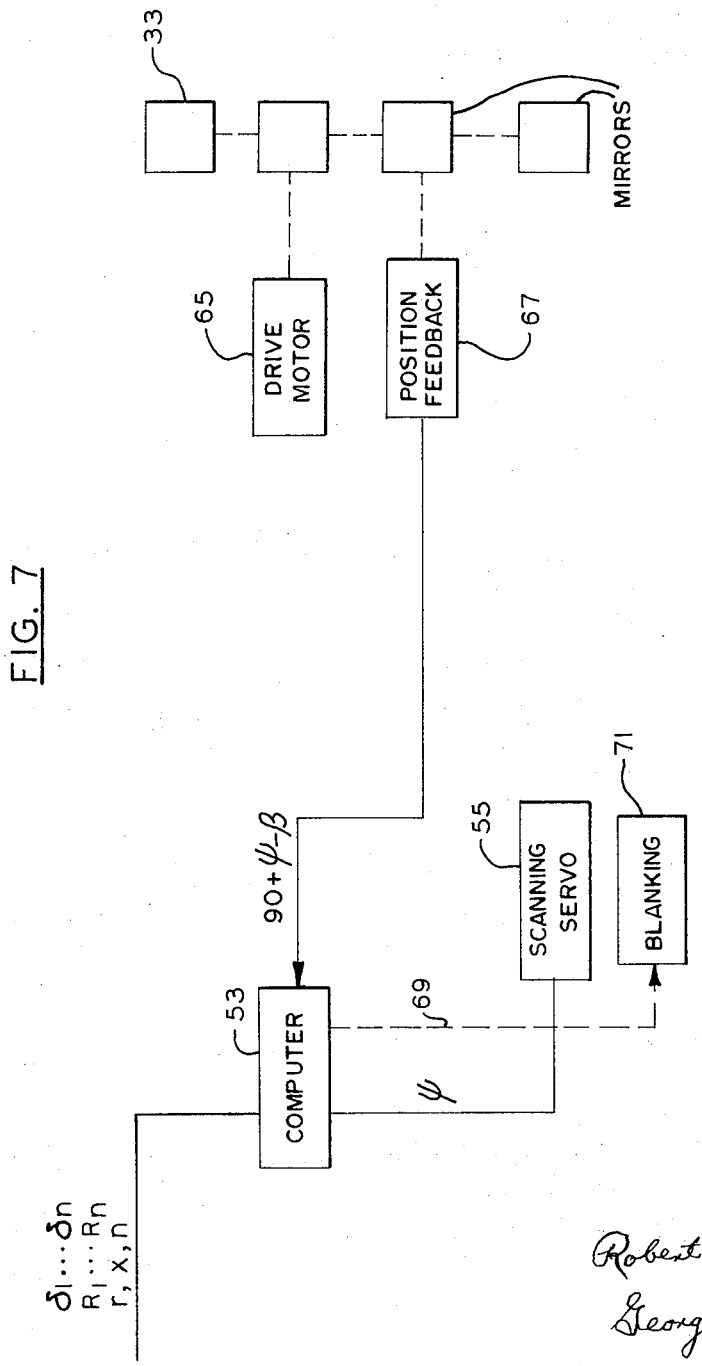
FIG. 7 is a block diagram of a variation of the drive system of FIG. 6.

Because of physical limitations on mirror rotation it may be desirable to synchronize the scan with mirror motion. FIG. 7 shows an embodiment which accomplishes this. Motor 65 is mechanically connected to mirrors 33 and will drive them at a constant rate between the desired limits. A pickup 67 such as a follow up potentiometer or shaft encoder, also tied to the mirrors picks up the angular position and provides it to computer 53. Computer 53 will now solve for $\psi$ using the input $90 + \psi - \beta$ and provide the $\psi$ output to scanning servo 55 which will have a better range of response than would mirrors 33. Since constant scanning may cause blurring of the light as viewed by the observer, pulsing of the light when at each mirror center may be desirable. Dotted line 69 indicate an optional blanking command to the light source 71. Computer 53 may have stored in it values of $\psi$ representing the mirror centers with which actual $\psi$ or scan position is compared. Thus it may provide a blanking command on line 69 which will blank the light except when it is on a mirror center, thus avoiding blurring as the light scans.

The principles involved in implementing the required equations in analog computer 53 are described in *Electronic Analog and Hybrid Computers* by Korn and Korn (McGraw-Hill Book Company, New York 1964). For an illustration of the implementation of similar equations see U.S. Pat. No. 3,101,645 granted to H. S. Hemstreet on Aug. 27, 1963.

A type of spot scanner 55 which could be used with the present invention is described in British Pat. No. 1,200,442. This patent also provides further instruction regarding the manner in which equations such as these herein may be implemented in computer 53.

Thus, two methods of simulating navigation lights have been shown. Although a number of specific embodiments have been disclosed it is obvious that various modifications may be made without departing from the basic principles of the invention.

What is claimed is:

1. In a shipboard navigation simulator wherein it is required to simulate, to observers on a simulated bridge, a navigation light of a predetermined range and bearing from the center of the simulated bridge, and wherein, due to the width of the bridge, the light being simulated should appear along a different bearing line from each point across the width of the simulated bridge, apparatus to cause the simulated light to appear along the proper bearing line from each point across the simulated bridge, said apparatus comprising:
    a. a circular viewing surface arranged in front of the simulated bridge and covering a major portion of the field of view of observers on said simulated bridge;
    b. a spot projector located at the center of the circle of said viewing surface, said projector including scanning means capable of scanning a spot of light across said viewing surface;
    c. means operative on said scanning means to cause said scanning means to periodically and repeatedly scan across said viewing surface;
    d. means synchronized with said scanning means and responsive to inputs representing the range and bearing from the center of said simulated bridge to the navigation light being simulated to cause the reflection of said scanning spot to be visible from each point on said simulated bridge only when the proper bearing line from that point intersects the spot on the viewing surface.

2. The invention according to claim 1 wherein said viewing surface is a front projection screen and said latter means comprise:
    a. a plurality of shutters interposed between said screen and said bridge, each shutter being controlled to open when the line of sight from any point on said simulated bridge passing through said shutter will intersect said scanning spot along said proper bearing line;
    b. computing means having as inputs the angular position of the scanning spot, the range and bearing of the simulated navigation light, the screen radius, and the bridge to shutter line distance and providing an output which is the linear distance from the center line of said plurality of shutters to a shutter the opening of which will provide said line of sight; and
    c. a plurality of comparing and driving means, one for each shutter, having said computer output as an input and arranged to compare said input with a stored value representing the position of its associated shutter with respect to the said center line and to provide an output to open said shutter when said input and stored values are equal.

3. The invention according to claim 2 wherein more than one navigation light is simulated, said computer has as inputs the ranges and bearings of each light simulated, said computer having an output for each light to be simulated and further including an additional plurality of said comparing means for each of said outputs and a plurality of Or gates, one of each shutter, having their outputs connected to corresponding ones of each of said plurality of driving means and having as inputs the outputs from corresponding ones of said pluralities of comparing means.

4. The invention according to claim 1 wherein said viewing surface comprises a plurality of individually rotatable mirrors and said synchronized means comprises means to cause said mirrors to rotate as said spot scans across the viewing surface.

5. The invention according to claim 4 wherein said means to rotate said mirrors comprises;
    a. a computer having as inputs the scan angle $\psi$, the navigation light bearing $\delta$ and range R, and the radius of the screen $r$, and having an output which is the required mirror rotation to simulate said navigation light when said scan is at said angle $\psi$; and
    b. a servo having said computer output as an input and arranged to drive said mirrors.

6. The invention according to claim 4 wherein said means to rotate said mirrors comprises:
    a. a motor arranged to continually drive said mirrors between two limits;
    b. means to sense the position of said mirrors;
    c. computer means having said sensed position, the range and bearing of the navigation light to be simulated, and the screen radius as inputs and providing an output to said spot light source representing the required position of the scanning light for said sensed position.

* * * * *